(12) United States Patent
Hayashi et al.

(10) Patent No.: US 7,404,347 B2
(45) Date of Patent: Jul. 29, 2008

(54) NONCIRCULAR WORKING DEVICE

(75) Inventors: Noriyasu Hayashi, Aichi pref. (JP); Masaki Hibino, Aichi pref. (JP); Norio Naganuma, Aichi pref. (JP); Kiyokazu Kainuma, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 11/364,734

(22) Filed: Feb. 28, 2006

(65) Prior Publication Data

US 2006/0196324 A1      Sep. 7, 2006

(30) Foreign Application Priority Data

Mar. 2, 2005    (JP)    ............... 2005-057529
Mar. 2, 2005    (JP)    ............... 2005-057530

(51) Int. Cl.
   *B23P 23/02*    (2006.01)
   *B23B 1/00*    (2006.01)
(52) U.S. Cl. ............. 82/114; 82/118; 29/888.04; 29/50
(58) Field of Classification Search ............ 82/113, 82/114, 1.11, 118; 29/888.04, 888.049, 50; 409/71
   See application file for complete search history.

(56) References Cited

U.S. PATENT DOCUMENTS 5,085,109 A * 2/1992 Hidehiko et al. ............ 82/118
5,295,076 A   3/1994 Gruener et al.
5,313,694 A * 5/1994 Yonemoto et al. ........ 29/27 R
5,315,526 A   5/1994 Maeda et al.
6,202,521 B1 * 3/2001 Rossetti et al. ............ 82/1.11
6,318,221 B1  11/2001 Gallagher

FOREIGN PATENT DOCUMENTS

DE    102 54 207 A1    6/2004
EP    0 562 232 A2     9/1993
JP    05-200601        8/1993
WO    91/11760         8/1991

OTHER PUBLICATIONS

Extended European Search Report for corresponding Application No. 06405083.4-2206 dated May 29, 2006.

* cited by examiner

*Primary Examiner*—Willmon Fridie
(74) *Attorney, Agent, or Firm*—Renner, Otto, Boisselle & Sklar, LLP

(57) ABSTRACT

A working device of a noncircular workpiece, such as a piston of an internal combustion engine, is improved. A workpiece 10 is held by a work spindle and rotated. A noncircular working device 100 has a noncircular working unit base 110 and is provided with a servo motor 104. A noncircular working unit 120 is positioned along a Y axis, and an arbitrary cutting tool 133 is selected from a cutting tool group 130. A servo motor 112 reciprocates the noncircular working unit 120 on an $X_2$ axis in synchronization with the rotation of the work spindle and performs noncircular working of the workpiece 10.

2 Claims, 7 Drawing Sheets

NONCIRCULAR WORKING DEVICE

The present application is based on and claims priority of Japanese patent application No. 2005-057529 filed on Mar. 2, 2005, and Japanese patent application No. 2005-057530 filed on Mar. 2, 2005, the entire contents of which are hereby incorporated by reference.

BACKGROUND OF THE INVENTION

1. Field of the Invention

The present invention relates to a working device which is equipped with a tool rest suitable for working a noncircular workpiece, such as a piston of an internal combustion engine.

2. Description of the Related Art

FIG. 7 shows a piston for an internal combustion engine. The piston 10 has a main body 12 formed from an aluminum casting, and the main body 12 has a through hole 13 into which a piston pin pierces. Although a head 15 of the piston main body 12 is also formed from an aluminum casting, a groove portion 14 which receives a piston ring is made of cast iron. That is, the piston 10 is formed from dissimilar metal materials of aluminum casting and cast iron.

In the lathe turning of an outside diameter portion of this piston 10, the piston which is a workpiece is held by a work spindle and rotated and the outside diameter portion is machined by use of a cutting tool $T_1$.

Because the piston 10 has a noncircular (oval) outside diameter profile, noncircular cutting is performed by moving the tool $T_1$ back and forth in synchronization with the rotation of the workpiece 1.

In performing this noncircular working, it is possible to perform noncircular working by reciprocating a usual tool rest in synchronization with the rotation of the work spindle.

However, a tool rest is equipped with a large number of working tools and has a large weight and, therefore, the tool rest has also a large inertial force. Therefore, the tool rest cannot cope with high-speed reciprocal movements.

The Japanese Patent Laid-Open Publication No. 5-200601 discloses a working device for noncircular working provided with a tool rest dedicated to noncircular working.

In the noncircular workpiece shown in FIG. 7, which is formed from dissimilar metals, it is necessary to perform groove working for a ring in addition to the cutting of an outside diameter portion.

Therefore, it is preferred that a noncircular working device be equipped with multiple tools suited to different materials and the different working of the materials.

The object of the present invention is to provide a noncircular working device equipped with multiple tools suited to different materials and the different working of the materials.

SUMMARY OF THE INVENTION

To achieve the above object, a noncircular working device of the present invention comprises a noncircular working unit provided with multiple cutting tools, a noncircular working unit base which slidably supports the noncircular working unit along a radial axis line of the workpiece, a motor for noncircular working which is attached to the noncircular working unit base and reciprocates the noncircular working unit, and means for positioning the noncircular working unit base along an axis line orthogonal to the radial axis line of the workpiece.

According to the present invention, an optimum cutting tool can be selected depending on the material quality and worked shape of a workpiece, and it is possible to increase working efficiency.

DETAILED DESCRIPTION OF THE PREFERRED EMBODIMENTS

Embodiment 1

The first embodiment of the present invention will be described on the basis of FIG. 1 to FIG. 3.

Figure 1:
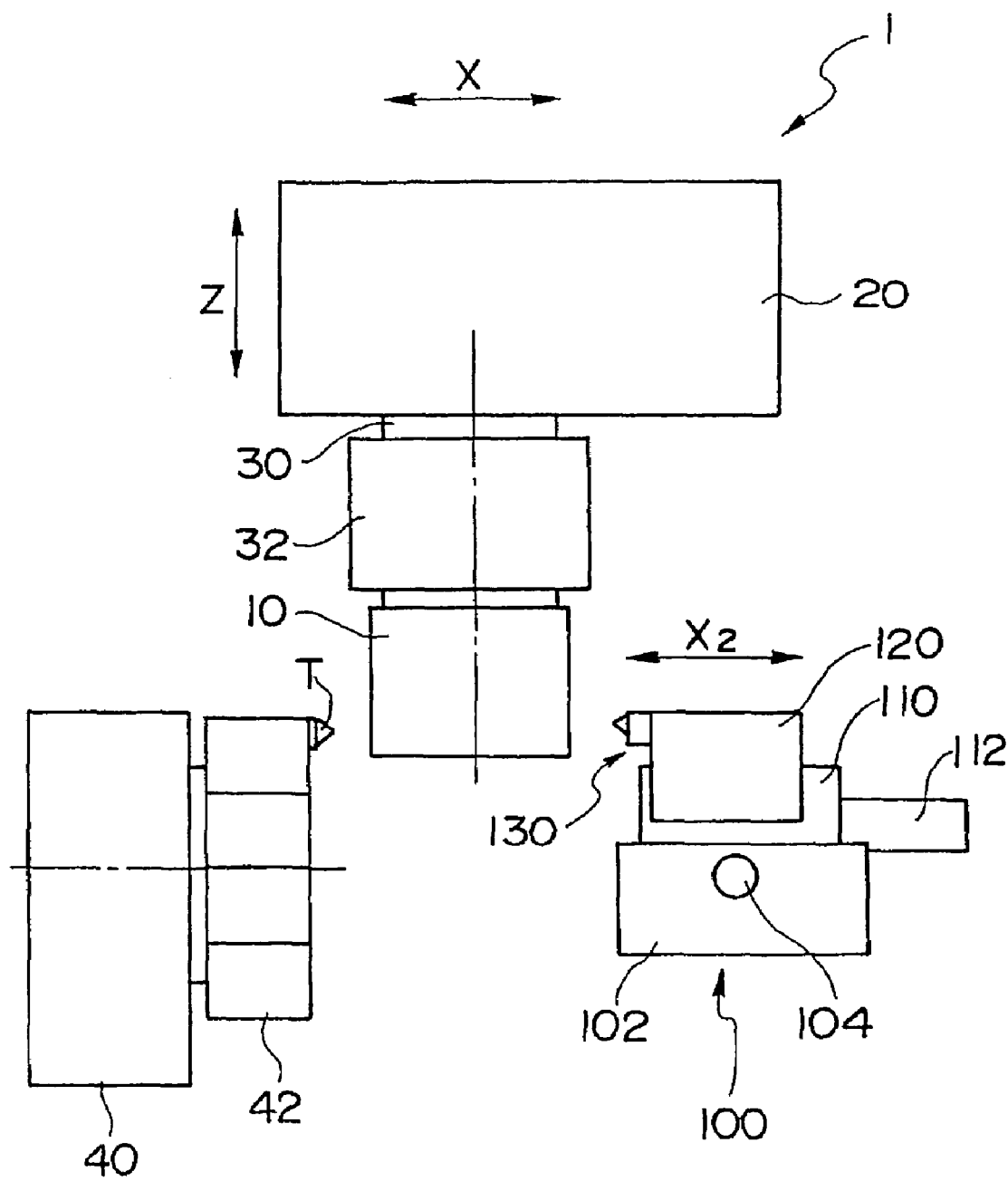
FIG. 1 is an explanatory diagram of an inverted lathe equipped with a noncircular working device in the first embodiment of the present invention.

FIG. 1 is an explanatory diagram which shows an outline of an inverted lathe equipped with a noncircular working device of the present invention. FIG. 2 is a plan view of an essential part of FIG. 1. And FIG. 3 is a sectional view of an essential part of FIG. 1.

An inverted lathe the whole of which is indicated by the reference numeral 1 has a work head 20, and the work head moves along an X axis which is a horizontal direction on the plane of FIG. 1 and a Z axis which is a vertical direction.

The work head 20 has a work spindle 30, and the work spindle 30 holds a workpiece 10 by use of a chuck 32.

The inverted lathe 1 has a tool head 40, and the tool head 40 has a turret tool rest 42. The turret tool rest 42 rotates around an axis line and can be equipped with, for example, twelve cutting tools.

In the case of a circular workpiece, the work head 20 which moves along the X axis and the Z axis and the tool head 40 synchronize and perform the working of a workpiece 10 by use of a tool T.

A noncircular working device the whole of which is indicated by the reference numeral 100 is disposed in a position which prevents interference with the tool head 40.

The noncircular working device 100 has a Y axis base 102 which is fixed to the base side of the inverted lathe. On the Y axis base 102, a noncircular working unit base 110 is slidably placed in a Y axis direction perpendicular to the paper face on FIG. 1. A servo motor 104 provided on the Y axis base 102 moves the noncircular working unit base 110 to a prescribed position on the Y axis by driving a screw shaft.

Upon the noncircular working unit base 110, a noncircular working unit 120 is provided so as to be slidable on an $X_2$ axis.

The noncircular working unit base 110 is equipped with a servo motor 112 and reciprocates the noncircular working unit 120 in the $X_2$ axis direction in synchronization with the rotation of the work spindle 30.

Figure 2:
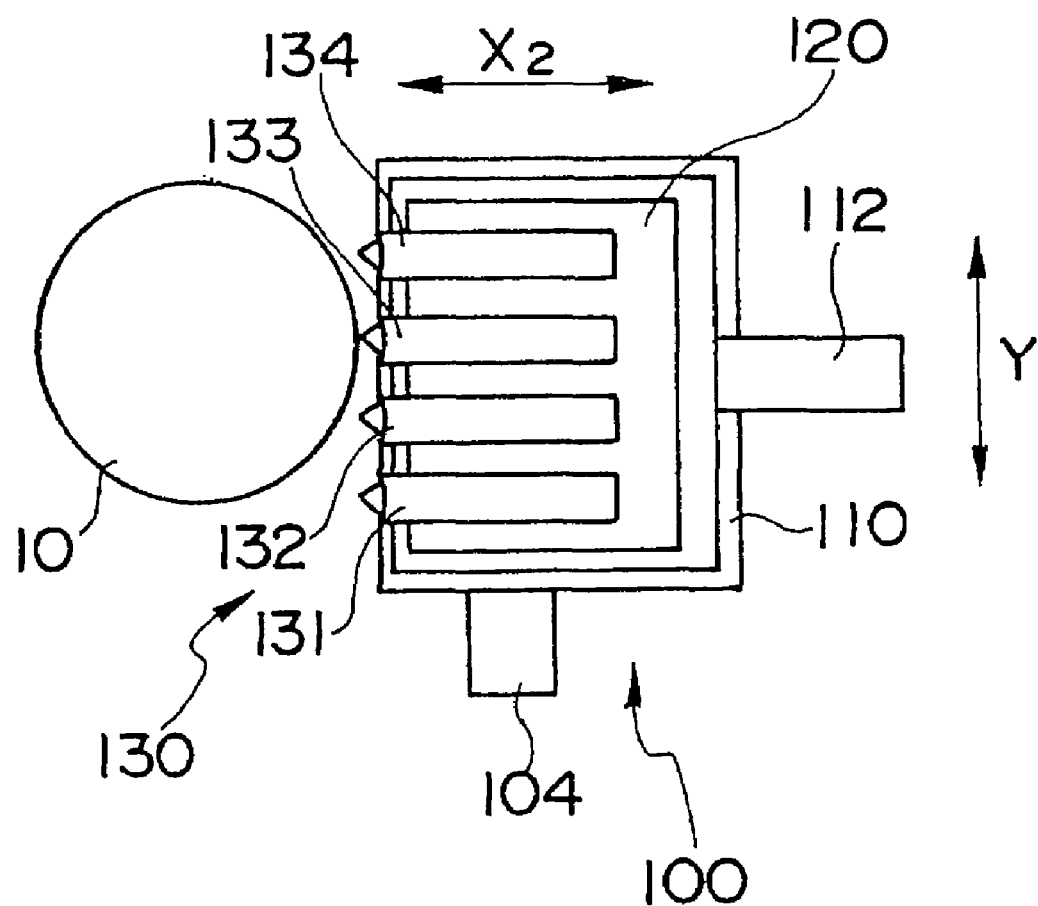
FIG. 2 is a plan view of an essential part of FIG. 1.

As shown in FIG. 2, on the noncircular working unit 120 there is provided a group of a series of cutting tools 130.

In the embodiment of the figure, the cutting tool group 130 is constituted by four cutting tools 131, 132, 133, 134.

Although four cutting tools are used in this embodiment, it is possible to prepare an arbitrary number of cutting tools according to working conditions.

In performing working, the Y axis motor 104 is driven and the cutting tool 133 is selected from the cutting tool group 130 and positioned so as to coincide with the axis line of the work spindle.

Next, the work head is controlled on the X axis and at the same time, the noncircular working unit 120 is reciprocated in synchronization with the rotation of the work spindle by driving the $X_2$ axis motor 112, whereby noncircular working is performed.

When the workpiece 10 is a piston, the workpiece is worked into an oval shape having a difference between a major axis and a minor axis in the range of, for example, 0.1 mm to 1.0 mm or so.

Figure 3:
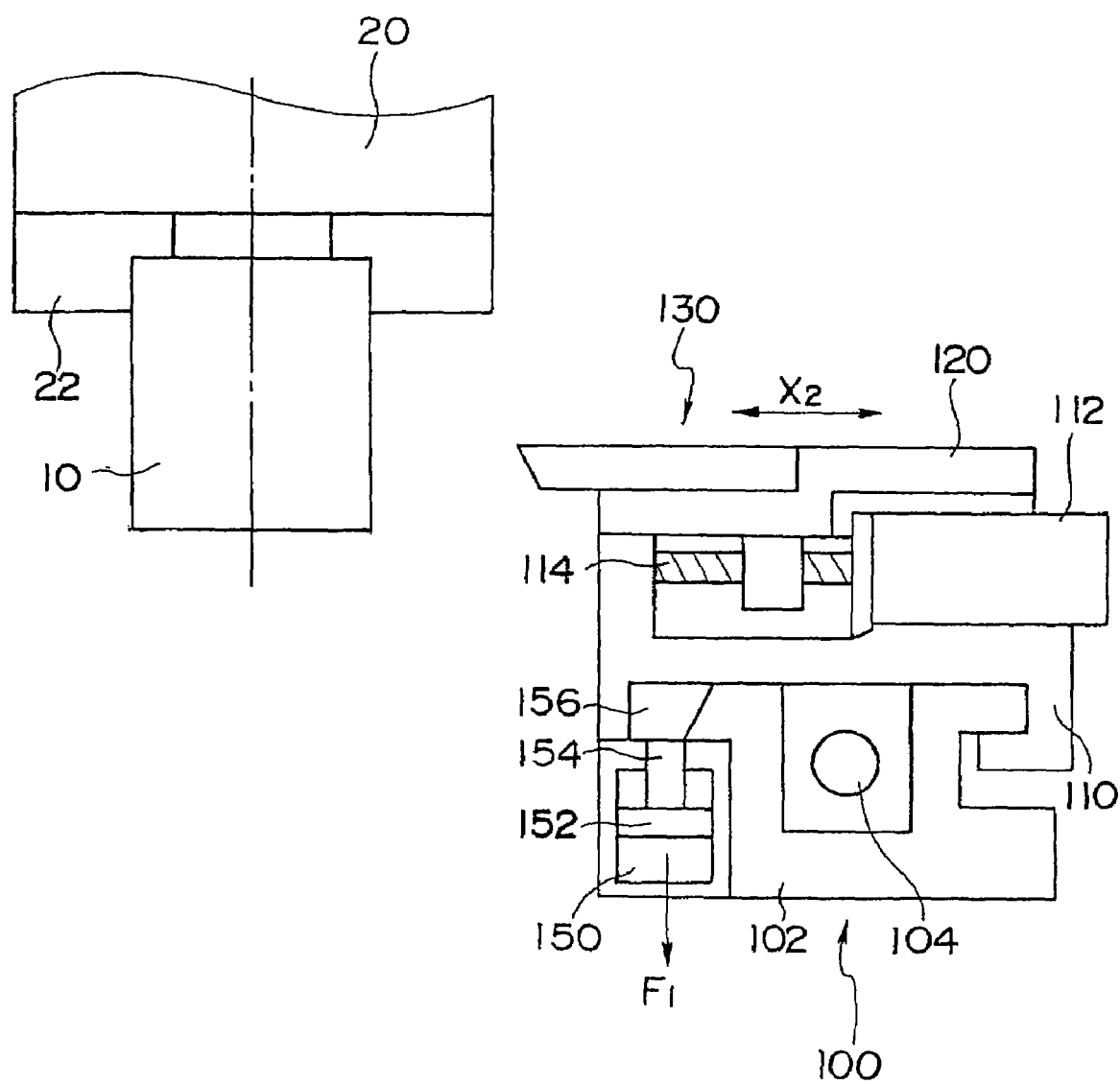
FIG. 3 is a sectional view of an essential part of FIG.

FIG. 3 is an explanatory diagram which shows a more concrete construction of the noncircular working device.

By driving the Y axis motor 104 provided on the Y axis base 102, the noncircular working unit base 110 moves in the Y axis direction.

The Y axis base 102 has a cylinder 150, and when the noncircular working unit base 110 into which a piston 152 is slidably inserted is positioned on the Y axis, the piston 152 is lowered in the direction of the arrow $F_1$. A taper cam 156 is provided at the leading end of a piston rod 154, and the noncircular working unit base 110 is clamped against the Y axis base 102.

The $X_2$ axis motor 112 is provided on the noncircular working unit base 110, and this $X_2$ axis motor 112 controls the noncircular working unit 120 via a ball screw 114 along the $X_2$ axis.

In making a change to an arbitrary cutting tool of the cutting tool group 130, clamping is cancelled and the above-described process is repeated.

The above-described noncircular working device of the first embodiment can perform noncircular working by thus selecting an arbitrary cutting tool from a group of multiple cutting tools arrayed on the Y axis direction. Therefore, productivity can be increased by using a cutting tool best suited to working conditions.

Also, an inertial force is reduced by limiting the weight on the noncircular working unit which reciprocates at a high speed to a minimum so that the noncircular working unit can cope with high-speed working.

Embodiment 2

The second embodiment of the present invention will be described on the basis of FIG. 4 to FIG. 6.

Figure 4:
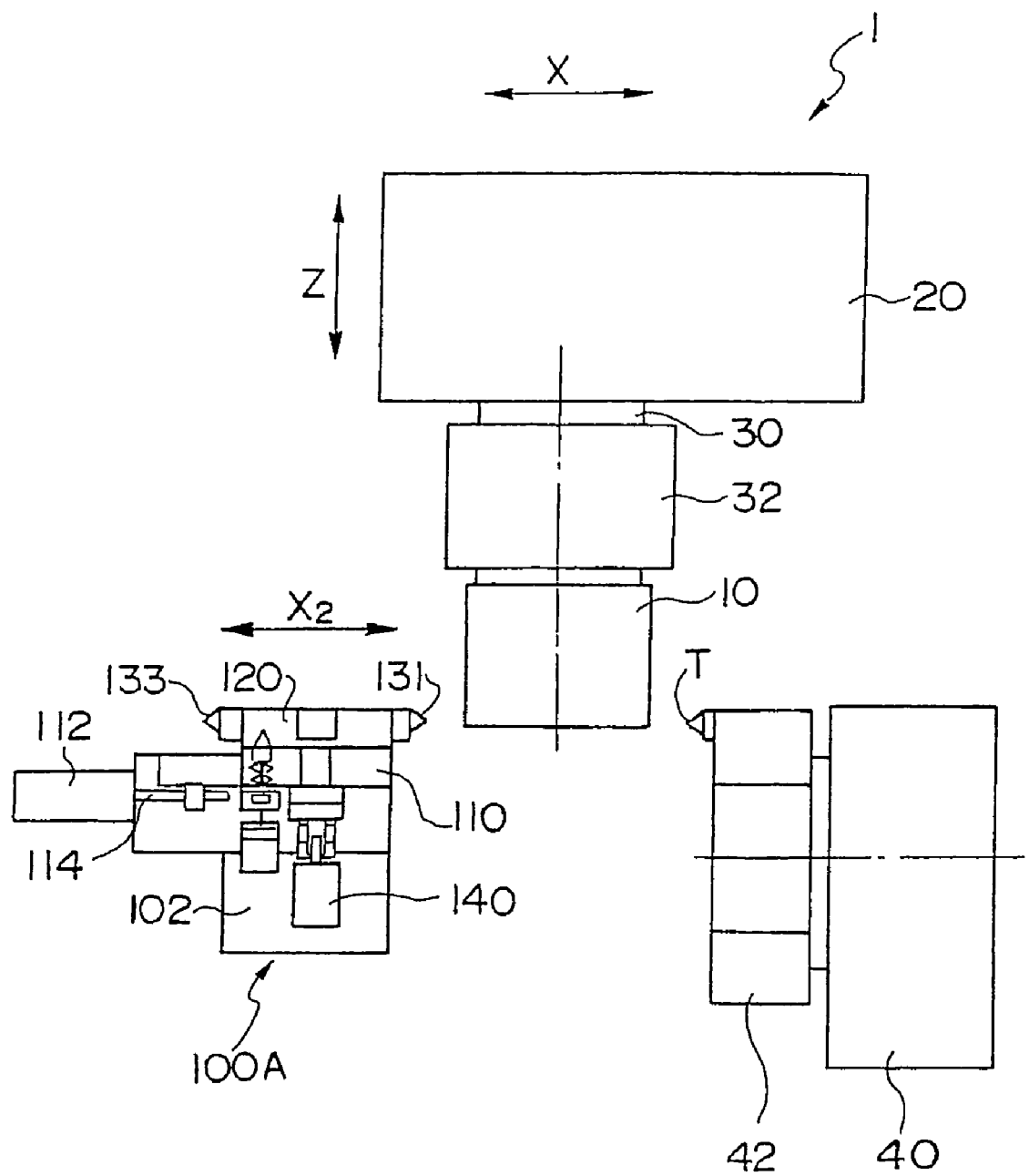
FIG. 4 is an explanatory diagram of an inverted lathe equipped with a noncircular working device in the second embodiment of the present invention.

FIG. 4 is an explanatory diagram which shows an outline of an inverted lathe equipped with a noncircular working device of the present invention. FIG. 5 is a plan view of an essential part of FIG. 4. And FIG. 6 is a sectional view of an essential part of FIG. 4.

An inverted lathe the whole of which is indicated by the reference numeral 1 has a work head 20, and the work head moves along an X axis which is a horizontal direction on the plane of FIG. 4 and a Z axis which is a vertical direction.

The work head 20 has a work spindle 30, and the work spindle 30 holds a workpiece 10 by use of a chuck 32.

The inverted lathe 1 has a tool head 40, and the tool head 40 has a turret tool rest 42. The turret tool rest 42 rotates around an axis line and can be equipped with, for example, twelve cutting tools.

In the case of a circular workpiece, the work head 20 which moves along the X axis and the Z axis and the tool head 40 synchronize and perform the working of a workpiece 10 by use of a tool T.

A noncircular working device the whole of which is indicated by the reference numeral 100A is disposed in a position which prevents interference with the tool head 40.

The noncircular working device 100A has a housing 102 which is fixed to the base side of the inverted lathe. Upon the housing 102, a noncircular working unit slide 110 is placed so as to be slidable in an $X_2$ axis direction. A servo motor 112 attached to the housing 102 reciprocates the noncircular working unit slide 110 in the $X_2$ axis direction via a ball screw 114.

Upon the noncircular working unit slide 110, a noncircular working unit 120 is rotatably provided and driven by a servo motor 140.

Figure 5:
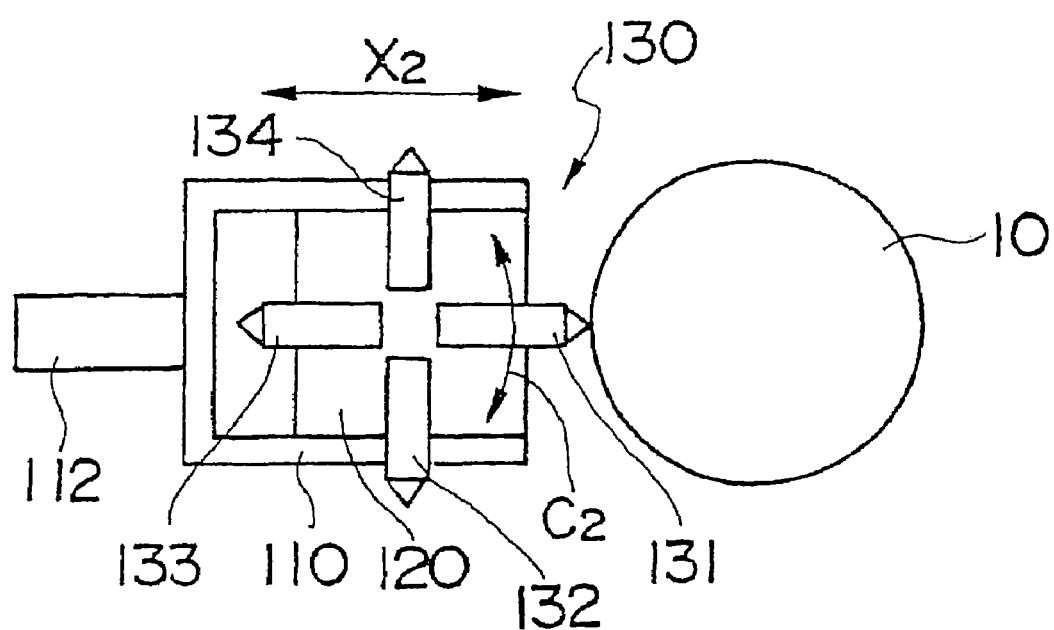
FIG. 5 is a plan view of an essential part of FIG. 4.

As shown in FIG. 5, a group of a series of cutting tools 130 is provided on the noncircular working unit 120. In the embodiment of the figure, the cutting tool group 130 is constituted by four cutting tools 131, 132, 133, 134 which are attached radially with respect to the noncircular working unit 120 which turns around a $C_2$ axis.

Although four cutting tools are used in this embodiment, it is possible to prepare an arbitrary number of cutting tools according to working conditions.

In performing working, the noncircular working unit is turned by driving the servo motor 140 and the cutting tool 133 is selected from the cutting tool group 130 and positioned so as to coincide with the axis line of the work spindle.

Next, the work head is controlled on the X axis and at the same time, the noncircular working unit 120 is reciprocated in synchronization with the rotation of the work spindle by driving the $X_2$ axis motor 112, whereby noncircular working is performed.

When the workpiece 10 is a piston, the workpiece is worked into an oval shape having a difference between a major axis and a minor axis in the range of, for example, 0.1 mm to 1.0 mm or so.

Figure 6:
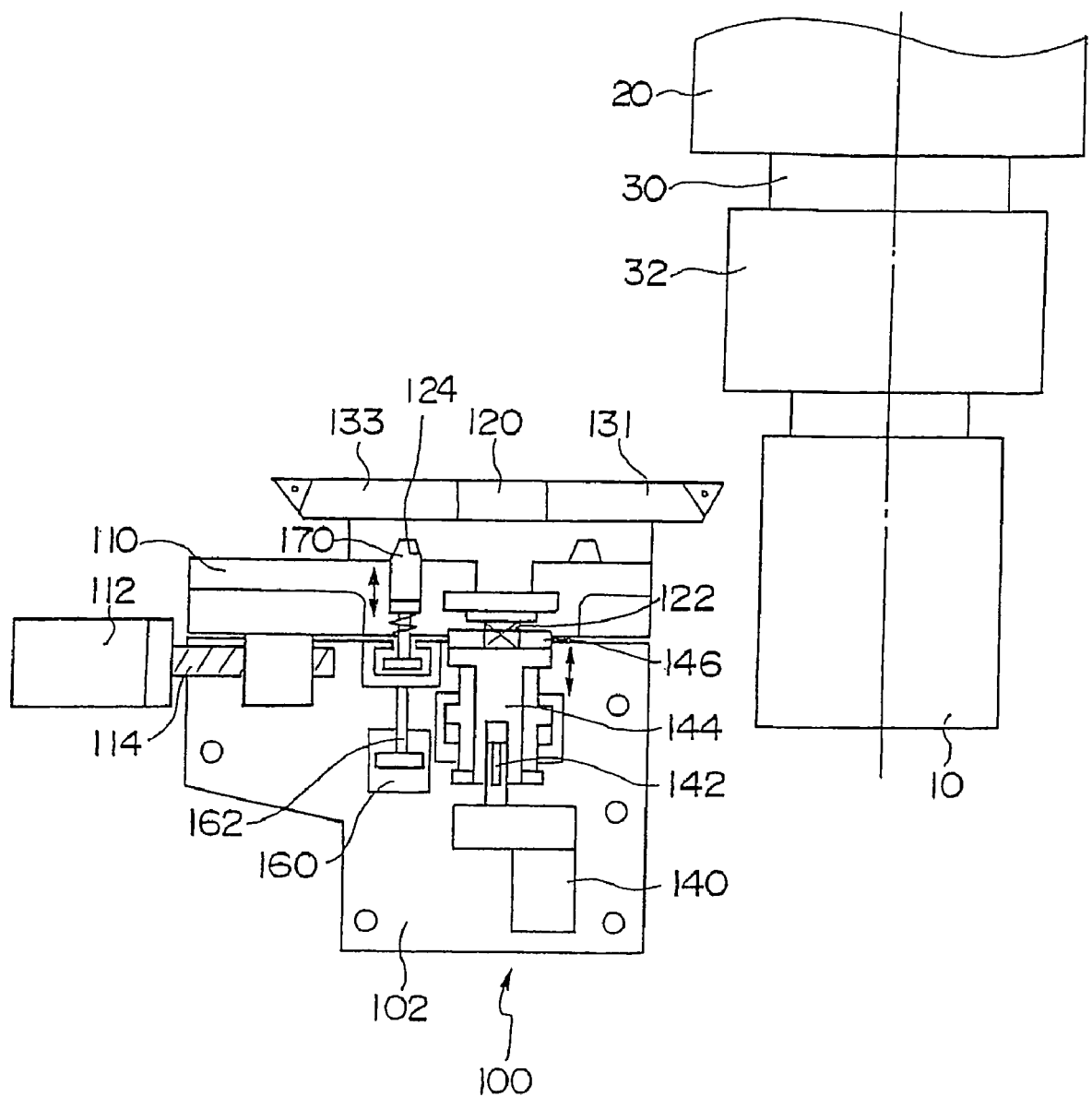
FIG. 6 is a sectional view of an essential part of FIG. 4.
Figure 7:
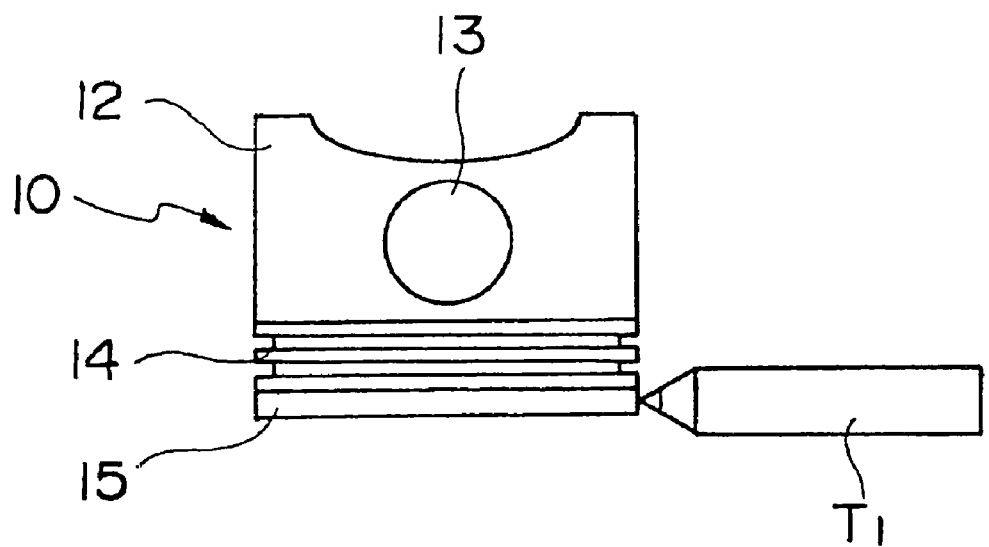
FIG. 7 is an explanatory diagram which shows an example of noncircular working.

FIG. 6 is an explanatory diagram which shows a more concrete construction of the noncircular working device.

The servo motor 140 provided within the housing 102 rotates a spline shaft 142 via reduction gear mechanism. A piston 144 which spline-engages with the spline shaft 142 moves up and down. A clutch 146 is provided on the top end of the piston 144, and this clutch 146 engages with and disengages from a clutch 122 of the noncircular working unit 120.

The noncircular working unit 120 is turned by giving an instruction to the servo motor 140, with the clutch connected, and an arbitrary cutting tool 131 is indexed to a position opposed to the axis line of the work spindle.

The housing 102 is provided with a cylinder 160, and this cylinder 160 moves a piston 162 up and down. A pin 170 is provided at the leading end of the piston 162, and this pin 170 is inserted into a pin hole 124 of the noncircular working unit, whereby the rotation of the noncircular working unit 120 is clamped.

By driving the servo motor 112 for the $X_2$ axis in this state, the noncircular working unit slide 110 is reciprocated and noncircular working of the workpiece 10 is performed by use of the cutting tool 131.

The reciprocation stroke of the noncircular working unit slide 110 is 2.0 mm or so and very short. Therefore, the pin 170 has a mechanism capable of reciprocating according to this stroke.

In making a change to an arbitrary cutting tool of the cutting tool group 130, clamping is cancelled and the above-described process is repeated.

The above-described noncircular working device of the second embodiment can perform noncircular working by thus selecting an arbitrary cutting tool from a group of multiple cutting tools which are radially arrayed. Therefore, productivity can be increased by using a cutting tool best suited to working conditions.

Also, an inertial force is reduced by limiting the weight on the noncircular working unit which reciprocates at a high speed to a minimum so that the noncircular working unit can cope with high-speed working.

What is claimed is:

1. A working device having a work head provided with a work spindle which rotates a workpiece, and a noncircular working device, the noncircular working device, comprising:
   a noncircular working unit provided with multiple cutting tools;
   a noncircular working unit base which turnably supports the noncircular working unit;
   a motor for noncircular working which is attached to a housing and reciprocates the noncircular working unit and the noncircular working unit base; and
   motorized means for rotating the turnably supported noncircular working unit and thereby indexing the noncircular working unit around an axis line parallel to the axis line of the workpiece, the motorized means being mounted separate from the noncircular working unit and the noncircular working unit base, and thereby not reciprocated by the motor for noncircular working,
   wherein the cutting tools mounted on the noncircular working unit are attached radially to the turning direction of the noncircular working unit.

2. The noncircular working device according to claim 1, wherein the cutting tools are attached at constant intervals with respect to the turning direction of the noncircular working unit.

* * * * *